(12) United States Patent
Maganov et al.

(10) Patent No.: US 11,453,447 B2
(45) Date of Patent: Sep. 27, 2022

(54) FREIGHT HANDLING APPARATUS FOR CARRIAGE OF LIQUID, SOLID AND/OR BULK GOODS

(71) Applicant: Publichnoe aktsionernoe obshchestvo "Tatneft" imeni V.D. Shashina, Tatarstan (RU)

(72) Inventors: Nail Ulfatovich Maganov, Tatarstan (RU); Mikhail Viktorovich Shvetsov, Tatarstan (RU)

(73) Assignee: Publichnoe aktsionernoe obshchestvo "Tatneft" imeni V.D. Shashina, Tatarstan (RU)

( * ) Notice: Subject to any disclaimer, the term of this patent is extended or adjusted under 35 U.S.C. 154(b) by 0 days.

(21) Appl. No.: 17/492,001

(22) Filed: Oct. 1, 2021

(65) Prior Publication Data
US 2022/0153360 A1    May 19, 2022

(51) Int. Cl.
*B62D 53/06* (2006.01)
*B60P 3/22* (2006.01)

(52) U.S. Cl.
CPC .......... *B62D 53/067* (2013.01); *B60P 3/2205* (2013.01)

(58) Field of Classification Search
CPC ........ B62D 53/067; B60P 3/2205; B60P 3/22; B60P 3/42; B60P 3/426
See application file for complete search history.

(56) References Cited

U.S. PATENT DOCUMENTS

| 4,627,629 A | * | 12/1986 | O'Neill | B60P 3/426 280/837 |
| 4,735,457 A | * | 4/1988 | Bonerb | B60P 3/426 296/10 |
| 6,015,055 A | * | 1/2000 | Bonerb | B60P 3/426 220/4.12 |

(Continued)

FOREIGN PATENT DOCUMENTS

| CA | 2043713 | * | 12/1992 | ............. B62D 21/16 |
| EP | 0933251 | * | 8/1999 | ............... B60P 3/42 |

(Continued)

OTHER PUBLICATIONS

EP 0933251 English translation, Obtained from Espacenet.com (Year: 1999).*

*Primary Examiner* — Jacob B Meyer
*Assistant Examiner* — Harold Eric Pahlck, III
(74) *Attorney, Agent, or Firm* — The Webb Law Firm

(57) ABSTRACT

The application relates to carriage of goods by public roads. A freight handling apparatus includes a frame having a coupling mechanism for coupling to a motor vehicle, a container-carrying deck, a wheel suspension, an outer body in the form of a rectangular freight container, the inner space of the outer body being divided in horizontal direction by a plate to accommodate in the lower freight compartment a reusable tank with necessary control and measurement equipment, filling and drain fittings. The freight handling apparatus simplifies and secures its transportation on roads as much as possible by lowering the center of gravity and (Continued)

arrangement of the center of gravity of the tank close to the axis of the vehicle carrying the apparatus, facilitates maintenance and inspection of the tank without removing it from the frame, and makes easier loading and unloading of goods.

4 Claims, 5 Drawing Sheets

(56) References Cited

U.S. PATENT DOCUMENTS

| | | | | |
|---|---|---|---|---|
| 6,065,625 | A * | 5/2000 | Bonerb | B60P 3/426 |
| | | | | 220/4.12 |
| 6,601,924 | B1 * | 8/2003 | Hicks | B60P 1/165 |
| | | | | 298/8 T |
| 6,609,863 | B1 * | 8/2003 | Morioka | B65D 90/046 |
| | | | | 383/61.3 |
| 8,100,614 | B2 * | 1/2012 | Jerich | B60P 3/426 |
| | | | | 410/2 |
| 2009/0212550 | A1 * | 8/2009 | Albers | B60P 3/426 |
| | | | | 220/4.12 |
| 2010/0314386 | A1 * | 12/2010 | Buonerba | B65D 90/047 |
| | | | | 220/666 |

FOREIGN PATENT DOCUMENTS

| | | | | |
|---|---|---|---|---|
| FR | 2943995 A1 | 10/2010 | | |
| GB | 2298830 | * 9/1996 | | B60P 3/22 |
| JP | 2008213815 A | 9/2008 | | |
| KR | 200290054 Y1 | 9/2002 | | |
| KR | 1020070037733 A | 4/2007 | | |
| RU | 2081766 C1 | 6/1997 | | |
| RU | 2556769 C2 | 7/2015 | | |

* cited by examiner

FREIGHT HANDLING APPARATUS FOR CARRIAGE OF LIQUID, SOLID AND/OR BULK GOODS

CROSS-REFERENCE TO RELATED APPLICATION

The present application claims priority to Russian Patent Application No. 2020132588, filed Oct. 2, 2020, the subject matter of which is expressly incorporated herein by reference.

The invention relates to carriage of goods, more specifically to carriage of goods by public roads.

A prior art high-volume delivery fuel tanker (Utility Model RU 156486 IPC B60S 5/02, B60P 3/22, B67D 7/04, publ. Oct. 11, 2015, Bull. No. 31) comprises a base chassis with a tank mounted thereon and having a filler neck; vent valves; an air filter; a sump and a level gauge; a pump with a drive from a base engine and optionally an autonomous engine; a water separator filter; a dispensed fuel-meter; a left canister and a right canister with pressure/suction hoses; a rear engineering compartment with valves and a shutoff and regulating equipment; pipes; monitoring and measurement instruments; electrical equipment; fire extinguishing means, and grounding devices, wherein the fuel tanker further comprises two lateral boxes with two reels for dispensing hoses fitted with dispensing cocks and a rear engineering compartment with eight reels for dispensing hoses fitted with dispensing cocks; a front cabinet arranged between the driver's cab and the tank, and comprising a container for a hydraulic drive for winding the reels and accommodating twenty-five fuel cans to carry special fluids; the hoses being wound on the reel by the hydraulic drive.

Drawbacks of the fuel tanker include a narrow field of use, since it is intended only for carriage of light oil products (fuel), a high center of gravity, which complicates transportation of the fuel tanker with hazardous goods, and low efficiency of use since after the fuel has been drained the tanker moves almost empty.

The most pertinent prior art is a container-carrying truck for a container with insert tanks (Patent RU 2602105 IPC B65D 88/12, B60P 03/24, B62D 63/00, publ. Oct. 11, 2016 Bull No. 31), comprising a base steel frame; a container-carrying deck; a wheel suspension with two or three wheel axles; a one piece closed metal reservoir in the form of a rectangular freight container; compartments with reusable polymer flexible inserts; service compartments/boxes with control and measurement instruments, wherein inner space of the container is divided by metal plates in horizontal and vertical direction into compartments, each of the compartments directly accommodating the reusable flexible polymer insert tanks with control and measurement instruments including a fill level sensor, a vent valve, a bottom valve, a pressure-type fill level limiter, and each insert tank is connected by systems of flexible fuel lines and pneumatic lines with the internal compartments/boxes: a) a freight dispenser unit accommodating control and measurement instruments, an adapter coupling, a transfer pump, a bottom valve pneumatic control unit, sockets, filter elements, a vapor outlet, a freight type indicator, ball valves, shutoff valves, connecting adapters, quick-release couplings, a fuel dispensing valve, b) a freight transfer unit comprising a transfer pump, a hydraulic motor, a power take-off, cardan shafts, filtering devices, control and measurement instruments, c) a fire compartment containing sand, a fire extinguisher, an automatic fire extinguisher control unit, d) a compartment with pressure-suction hoses, e) a compartment with autonomous power equipment, f) a compartment with a grounding device, g) service inspection hatches and doors provided for each compartment in side walls and roof of the container.

Disadvantages of this container-carrying truck include the complexity of transportation, since it is almost impossible to register, using the flexible insert tanks, the general center of gravity with the axis of the container-carrying truck, and this imbalance increases dramatically when liquid is drained from, at least one insert tank, which is not safe for further operation, while rectangular compartments preclude lowering the center of gravity for greater stability; further disadvantages include the complexity of maintenance and inspection, since each sectioning is provided by the number of insert tanks which are to be removed from the container and disconnected from the entire engineering equipment (pumping, filling, draining units, etc.) for maintenance, inspection and repair, and the complexity of transformation of the container to carry different goods, because selected compartment should be freed from the insert tank, prepared to carry new goods and loaded through non-specialized cargo openings, thereby disbalancing the entire container.

The technical problem solved by the present invention is to provide a structure of a freight handling apparatus for carriage of liquid, solid and/or bulk goods, which can simplify and secure its transportation by roads as much as possible by lowering the center of gravity and arranging the tank center of gravity close to the axis of the vehicle carrying the apparatus, and simplify maintenance and inspection of the tank without removing it from the frame, make easier loading and unloading solid and/or bulk goods.

The problem is solved by a freight handling apparatus for carriage of liquid, solid and/or bulk goods, comprising a frame having a coupling mechanism for coupling to a motor vehicle, a container-carrying deck, a wheel suspension, an outer body in the form of a rectangular freight container, the inner space of the outer body being divided in horizontal direction by a plate to accommodate in the lower freight compartment a reusable tank with necessary control and measurement equipment, filling and drain fittings.

The novelty of the invention is that the container-carrying deck is multilayered as being lowered together with the frame in the places where it is technically feasible to as low as possible level that allows transportation by public roads; the tank is rigid and symmetrical with respect to the longitudinal vertical plane and comprises one compartment or multiple compartments divided by transverse partitions; the bottom of the tank in the longitudinal direction repeats the contour of the container-carrying deck, while the top thereof in the longitudinal direction is even and has at least one access hatch for inspection and maintenance of the tank; the plate above the lower freight compartment comprises at least one closable service aperture for access to respective access hatch; the width of the tank is at least 1.5 times the height of the tank, and the center of gravity of the tank, upon having been fixed on the frame, is displaced with respect to its vertical plane passing through the longitudinal axis by no more than 20 cm.

Further novelty is that at least one hinged, sliding or swing door is used to close each aperture.

Further novelty is that the bottom of the container-carrying deck is reinforced with thicker metal plates in the places exposed to greatest external impact during transportation of the tank.

Figure 1:
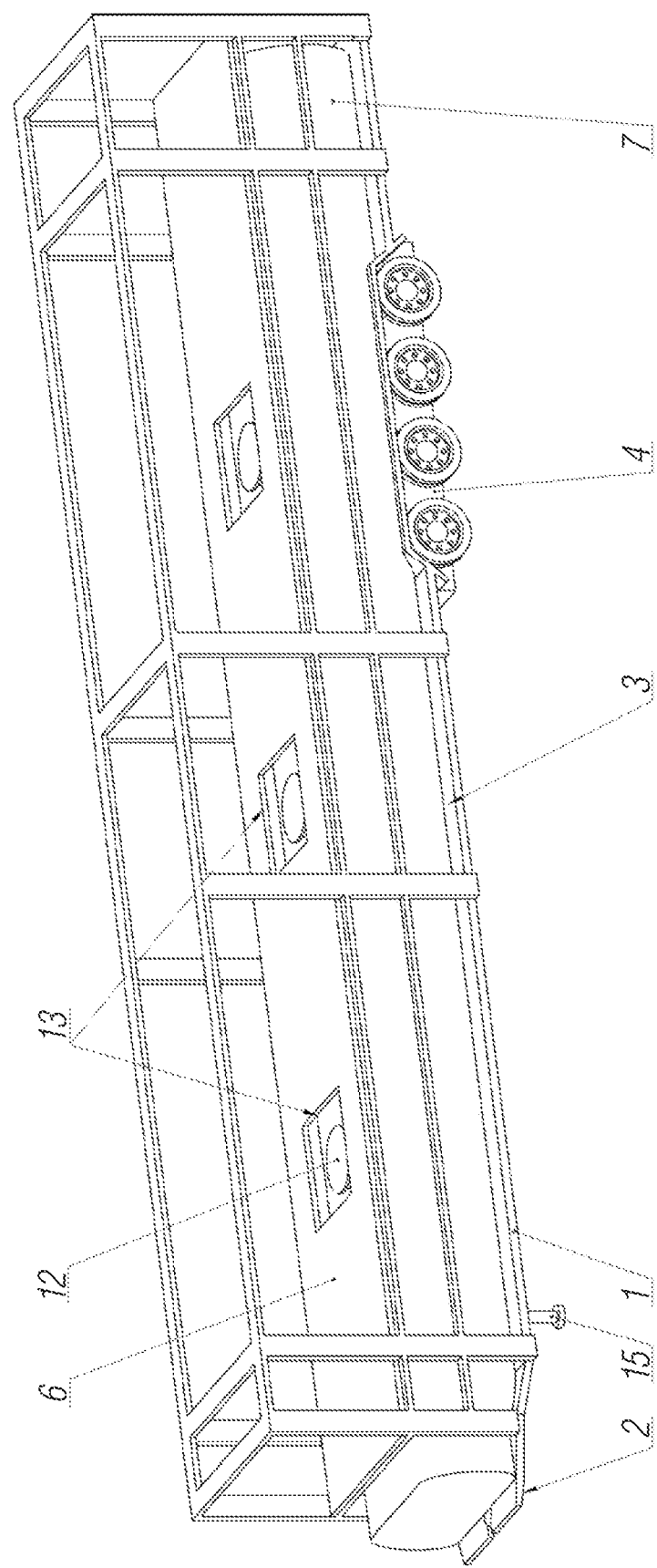
FIG. 1 shows an apparatus without an outer body and doors that close apertures in the plate.

A freight handling apparatus for carriage of liquid, solid and/or bulk goods comprises a frame 1 (FIG. 1) having a coupling mechanism 2 for coupling to a towing truck (not shown), a container-carrying deck 3, a wheel suspension 4, an outer body 5 (FIG. 3) having the shape of a rectangular freight container, the internal space of which is divided by a plate 6 (FIGS. 1 and 2) in horizontal direction to accommodate in the lower freight compartment a reusable tank 7 with necessary control and measurement instruments, filling and drain fittings (not shown in FIGS. 1-5). To avoid overloading of the drawings, all associated elements for ensuring operation of the apparatus are omitted (FIGS. 1-5). The container-carrying deck 3 (FIG. 5) is multilayered as being lowered together with the frame 1 in the places where it is technically feasible to as low as possible level that allows transportation by public roads, that is, with a ground clearance k not less than the level permissible for the frame 1. The tank 7 (FIG. 4) is rigid and symmetrical with respect to longitudinal vertical plane S and has one compartment or multiple compartments divided by transverse partitions (not shown). The design feature of the tank 7 is that the center 9 of gravity (shown conditionally) of the tank is displaced during the manufacture from the vertical plane 8 passing through the longitudinal axis (not shown) by no more than h≤20 cm as the result of manufacturing tolerances. Bottom 10 (FIG. 5) of the tank 7 in the longitudinal direction repeats the contour of the container-carrying deck 3, while top 11 in the longitudinal direction is even and comprises at least one access hatch 12 (FIG. 1) for inspection and maintenance of the tank 7. The number of hatches 12 and partitions of the tank 7 is chosen to observe requirements for carriage of goods by public roads (for example, approved by the Order of the Ministry of Transport of Russia dated Jan. 12, 2018, No. 10, "On Approval of Requirements to Organization of Traffic of Heavy and/or Large-Size Vehicles on Roads") in the tank 7 and the body 5 (FIG. 3) as a whole. The plate 6 (FIG. 1) above the lower freight compartment has at least one closable service aperture 13 for access to respective hatch 12. Width L of the tank 7 (FIG. 4) is at least 1.5 times the height H of the tank 7 (L/H≥1.5). This embodiment of the tank 7 with its low-lying bottom 10 (FIG. 5) significantly lowers the overall center of gravity (not shown) of the entire apparatus, thereby increasing its stability during transportation and in turns. For carriage of loose, small and unfastened goods in the upper freight compartment of the body 5 (FIG. 3) each service aperture 13 (FIG. 1) in the plate 6 (FIG. 2) is closed by respective at least one hinged, sliding or swing door 14. The structure of door 14 is not claimed here as various designs thereof are publicly known. To carry goods by mountain and/or gravel roads, the bottom of the container-carrying deck 3 can be reinforced with additional thick metal plates (not shown) in the places exposed to the greatest external impact during transport of the tank 7.

Structural elements, connections and engineering equipment of the apparatus, which does not affect the understanding of the invention, are not shown in FIGS. 1 to 5 or are shown conditionally.

The apparatus operates in the following manner.

Figure 2:
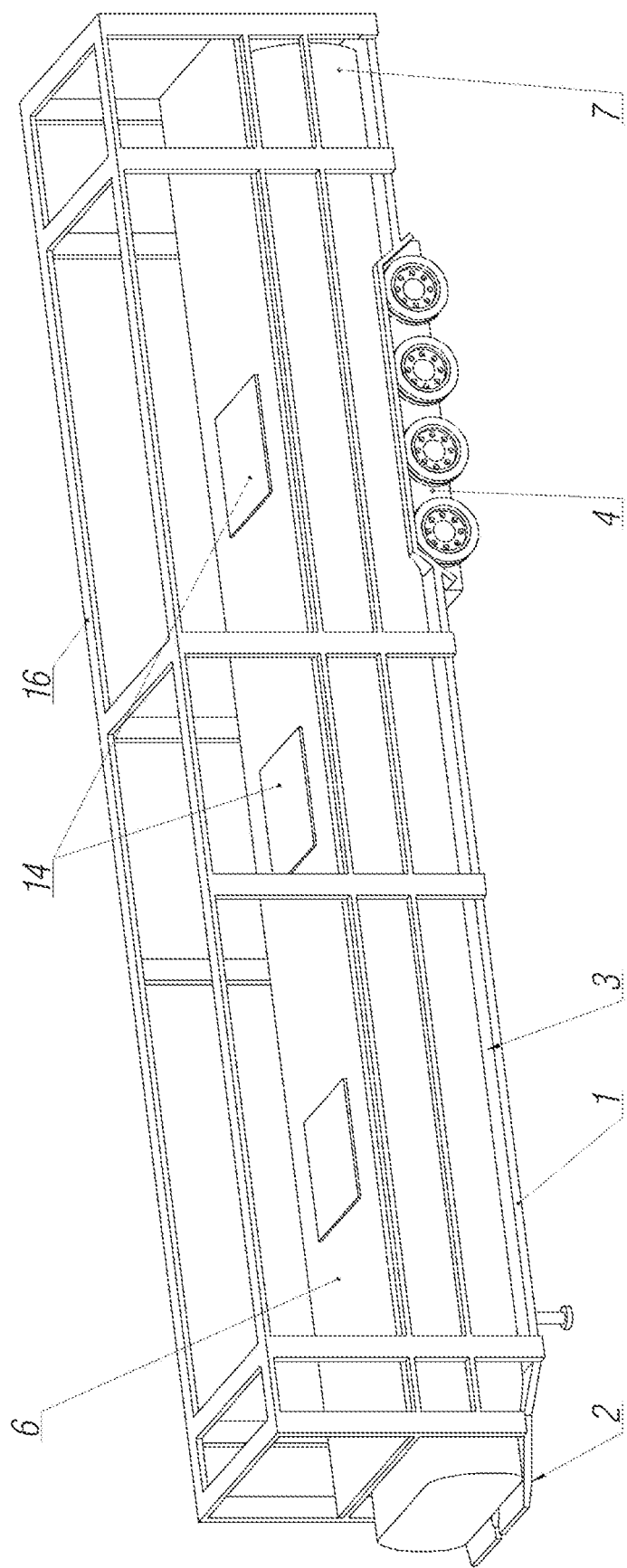
FIG. 2 shows an apparatus without an outer body with doors that close apertures in the plate.
Figure 3:
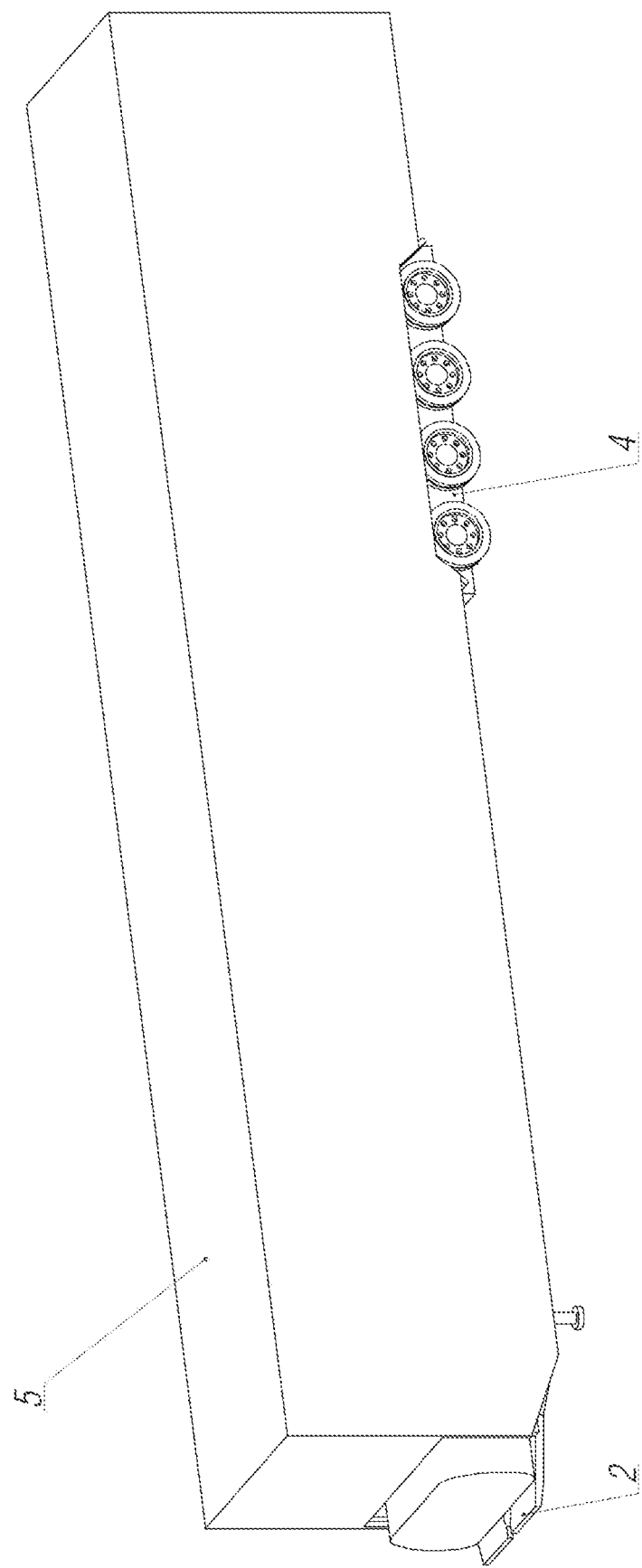
FIG. 3 shows an apparatus with an outer body.
Figure 4:
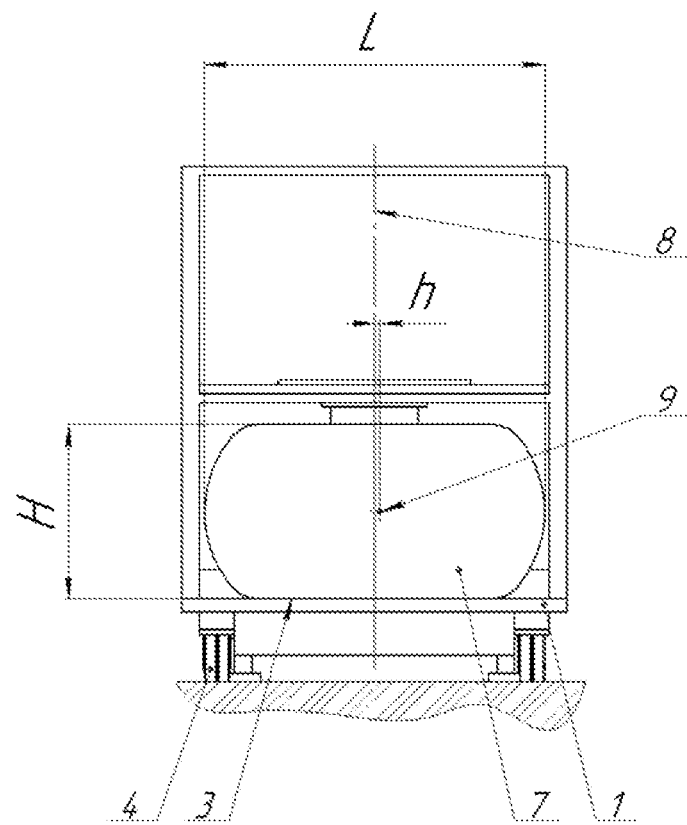
FIG. 4 is a rear view of the apparatus of FIG. 2.
Figure 5:
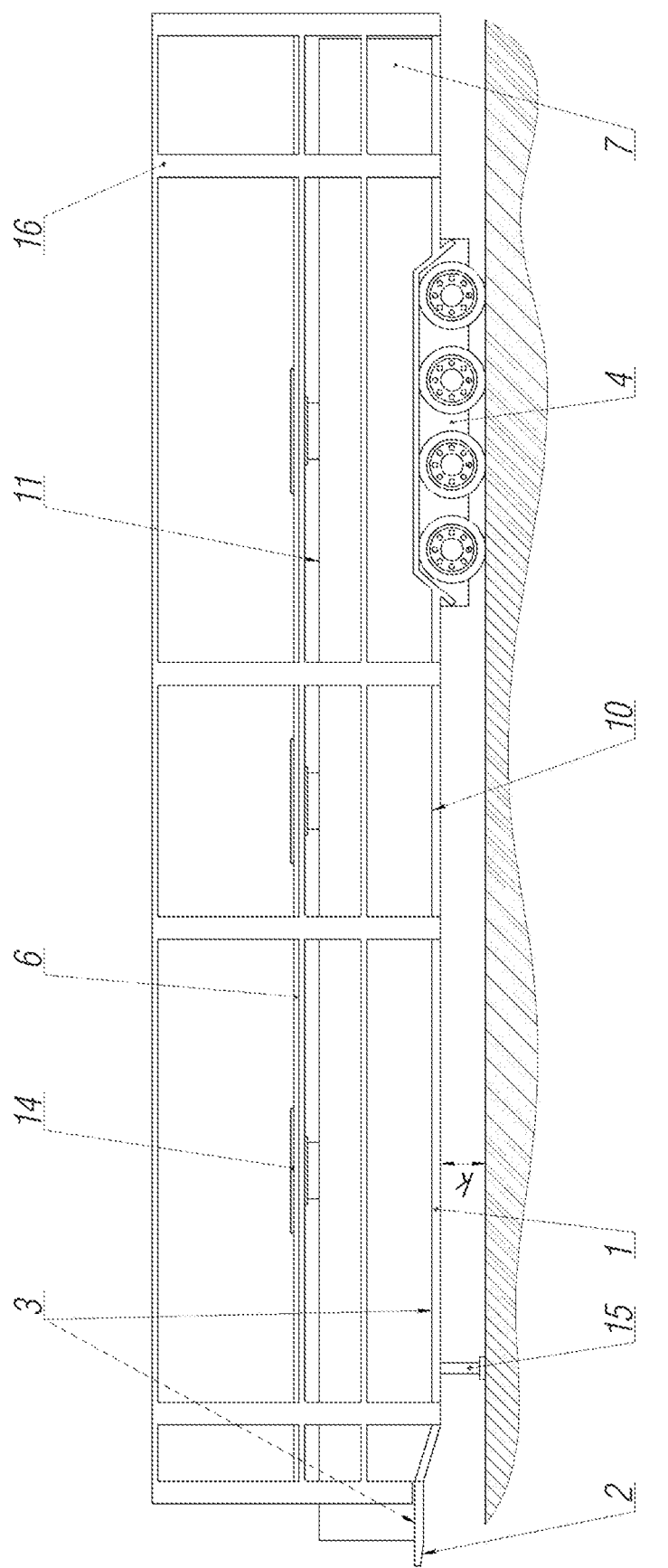
FIG. 5 is a side view of the apparatus of FIG. 2.

First, a frame 1 (FIG. 1) with a container-carrying deck 3 (FIG. 5) is manufactured in accordance with the safety and carrying capacity requirements, wherein the bottom of the deck is lowered together with the frame 1 to as low as possible level that allows transportation by public roads and ensures necessary road clearance k. The frame 1 (FIG. 1) is provided in front with a coupling mechanism 2 for coupling to a towing truck and junctions for hydraulic and electrical systems (not shown) of the truck. The frame 1 is provided with a wheel suspension 4 that can withstand the required load, own hydraulic and electrical systems (not shown) connected to respective junctions of the coupling mechanism 2, and retractable supports 15, if necessary. The tank 7 is fixed on the frame 1 so that its bottom 10 bears tightly against the container-carrying deck 3 and the vertical plane 8 (FIG. 4), passing through the longitudinal axis, coincides with similar plane 8 of the frame 1. In so doing, after fixation on the frame 1 the center 9 of gravity of the tank 7 will be displaced relative to its vertical plane 8 by value h, which is not more than 20 cm (h≤20 cm). The frame 1 (FIG. 5) is provided with a cage 16 and a plate 6 placed above the top 11 and hatches 12 (FIG. 1) of the tank 7 so that the service aperture 13 in the plate 6 is arranged above respective hatch 12. Each service aperture 13 is closed with respective door 14 (FIG. 2). The structure of the frame 16 is not claimed here as a great number of them are publicly known. The body 5 is fixed on the frame 16 (FIG. 3). The apparatus is preferably manufactured with carrying capacity and overall dimensions that observe regulations of the country of use (for example, in the Russian Federation this is Order No. 119 of the Ministry of Transport of Russia, dated Mar. 29, 2018 "On Approval of the Procedure for Implementation of Weight and Dimensional Control of Vehicles, Including the Procedure for Organizing Stations of Weight and Dimensional Control of Vehicles"). The body 5 can be provided with lockable side doors (not claimed) for access to control elements (not shown), control and measurement instruments, filling and drain fittings of the tank 7 (FIG. 2). The body 5 (FIG. 3) can be further provided with upper, side and/or rear loading ports (not shown), which can be closed, if appropriate, by respective doors (not shown), to load required solid or bulk goods into the upper freight compartment of the body 5. Depending on the purposes and tasks of the upper freight compartment of the body 5 and to facilitate approach of specialists to doors 14 (FIG. 2) of the service apertures 13 (FIG. 1) in the plate 6, providing easy access to the access hatches 12, dimensions and arrangement of loading ports in the body 5 (FIG. 3), methods of their closure may be various (they are not claimed here as various designs of them are publicly known). The upper freight compartment of the body 5 may be further provided with containers and/or shelves to carry various solid or bulk goods.

After manufacturing the apparatus, it is connected to a towing truck using the coupling mechanism 2, joining through respective junctions the hydraulic and electrical systems of the frame 1 (FIG. 2) and the towing truck, which tows the apparatus to the locations where the tank 7 (FIG. 2) is filled with liquid and/or the upper freight compartment of the body 5 is loaded with goods (FIG. 3). Then the towing truck tows the apparatus to the locations where liquid is drained from the tank (FIG. 2) and/or the upper freight compartment of the body 5 is unloaded (FIG. 3). The locations of filling/draining liquid and loading/unloading goods may be in different places for more complete filling of the body with goods 5 along the routes, which is especially advantageous when oil products are carried in the tank 7 (FIG. 2). Easy access to the hatches 12 (FIG. 1) facilitates maintenance and inspection of the tank 7 without removing it. Low arrangement of the overall center of gravity of the apparatus substantially simplifies its transportation, especially on twisty and slippery roads, owing to reduced likelihood of roll-over of the body 5 (FIG. 3) with the tank 7

(FIG. 2) and the frame 1 at maneuvers of the towing truck, which makes transportation of the apparatus as safe as possible.

The present freight handling apparatus for carriage of liquid, solid and/or bulk goods simplifies and secures its transportation on roads as much as possible by lowering the center of gravity and arrangement of the center of gravity of the tank close to the axis of the vehicle carrying the apparatus, facilitates maintenance and inspection of the tank without removing it from the frame, and makes easier loading and unloading of solid and/or bulk goods.

We claim:

1. A freight handling apparatus for carriage of liquid, solid and/or bulk goods, the apparatus comprising:
    a frame having a coupling mechanism for coupling to a motor vehicle,
    a container-carrying deck,
    a wheel suspension,
    an outer body in the form of a rectangular freight container, an inner space of the outer body being divided in a horizontal direction by a plate to accommodate in a lower freight compartment,
    a reusable tank having necessary control and measurement equipment, and
    filling and draining fittings,
    wherein:
        the container-carrying deck is multilayered so that the container-carrying deck is lowered together with the frame in places, where technically feasible, to a lowest possible level that allows transportation by public roads,
        the reusable tank is rigid and symmetrical with respect to a longitudinal vertical plane,
        a bottom of the reusable tank in a longitudinal direction repeats a contour of the container-carrying deck, while a top thereof in the longitudinal direction is even and has at least one access hatch for inspection and maintenance of the reusable tank,
        the plate above the lower freight compartment comprises at least one closable service aperture for access to the at least one access hatch,
        a width of the reusable tank is at least 1.5 times a height of the reusable tank, and
        a center of gravity of the reusable tank, upon having been fixed on the frame, is displaced with respect to the longitudinal vertical plane passing through a longitudinal axis by no more than 20 cm.

2. The freight handling apparatus for carriage of liquid, solid and/or bulk goods of claim 1, wherein at least one hinged, sliding or swing door is used to close the at least one closable service aperture.

3. The freight handling apparatus for carriage of liquid, solid and/or bulk goods of any one of claim 1 or 2, wherein a bottom of the container-carrying deck is reinforced in places exposed to greatest external impact during transportation of the reusable tank.

4. The freight handling apparatus for carriage of liquid, solid and/or bulk goods of claim 2, wherein the bottom of the container-carrying deck is reinforced in places exposed to greatest external impact during transportation of the reusable tank.

* * * * *

UNITED STATES PATENT AND TRADEMARK OFFICE
CERTIFICATE OF CORRECTION

PATENT NO. : 11,453,447 B2  
APPLICATION NO. : 17/492001  
DATED : September 27, 2022  
INVENTOR(S) : Nail Ulfatovich Maganov et al.

Page 1 of 1

It is certified that error appears in the above-identified patent and that said Letters Patent is hereby corrected as shown below:

On the Title Page

Column 1, Assignee, Line 2, Delete ""Tatneft"" and insert -- (Tatneft) --

Column 1, Prior Publication Data, Line 2, Below "2022" insert -- Foreign Application Priority Data Oct. 2, 2020 (RU) ....................... 2020132588 --

Signed and Sealed this  
Twenty-eighth Day of February, 2023

Katherine Kelly Vidal  
*Director of the United States Patent and Trademark Office*